Jan. 18, 1949.　　W. L. SCHLEGEL, JR　　2,459,776
BRAKE HEAD BALANCING DEVICE
Filed June 18, 1945　　2 Sheets-Sheet 1
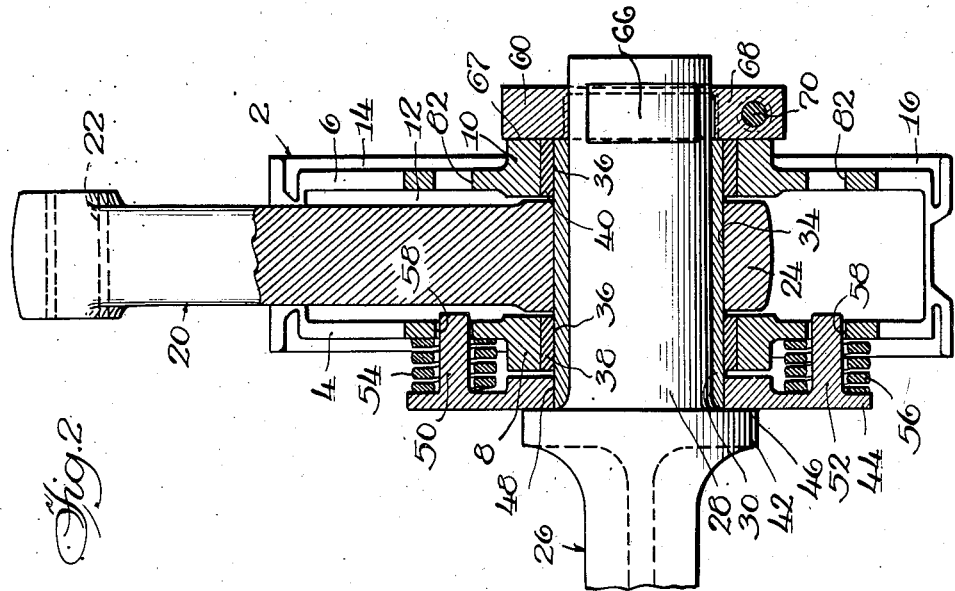
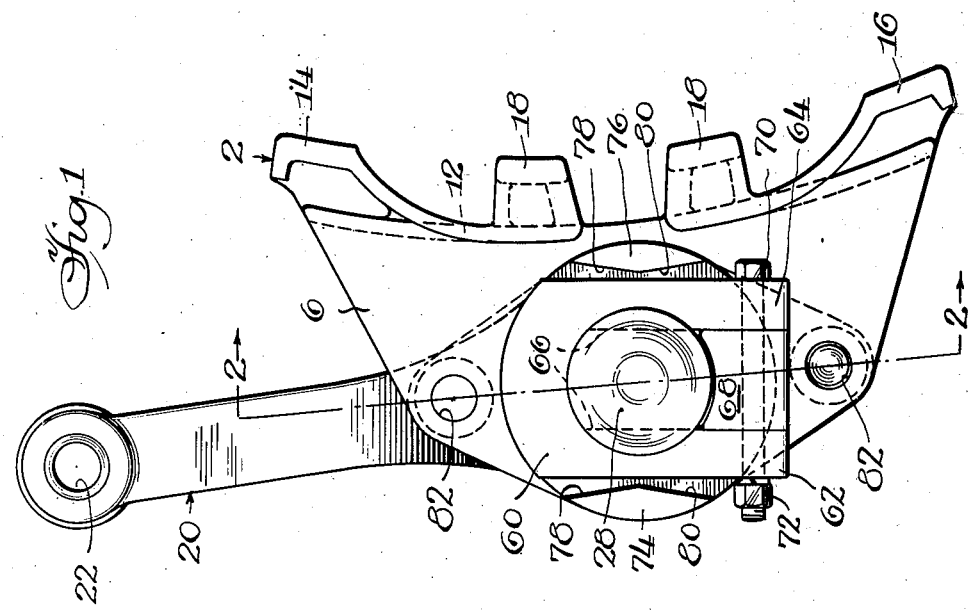
INVENTOR.
Walter L. Schlegel, Jr.
BY
Wm. O. B. Garner
Atty.

Jan. 18, 1949.  W. L. SCHLEGEL, JR  2,459,776
BRAKE HEAD BALANCING DEVICE
Filed June 18, 1945  2 Sheets-Sheet 2
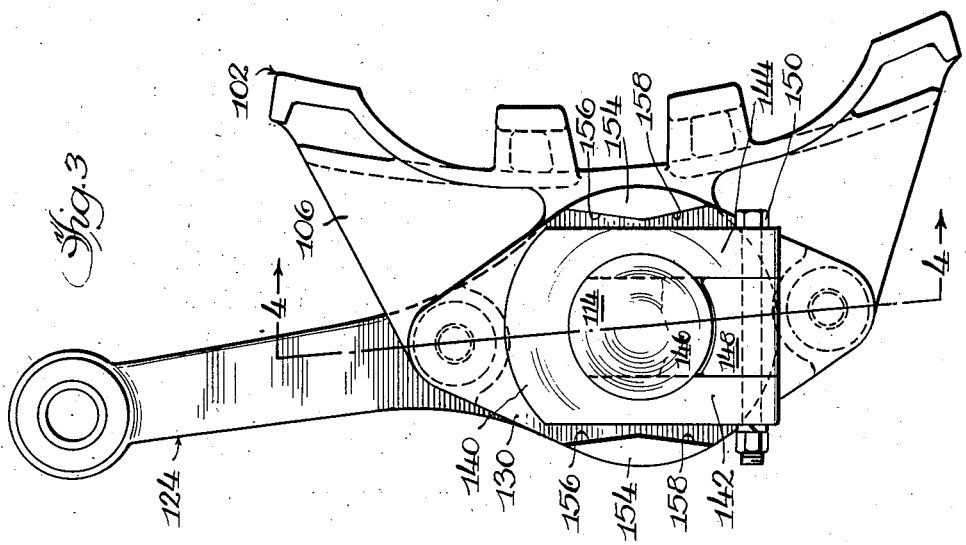
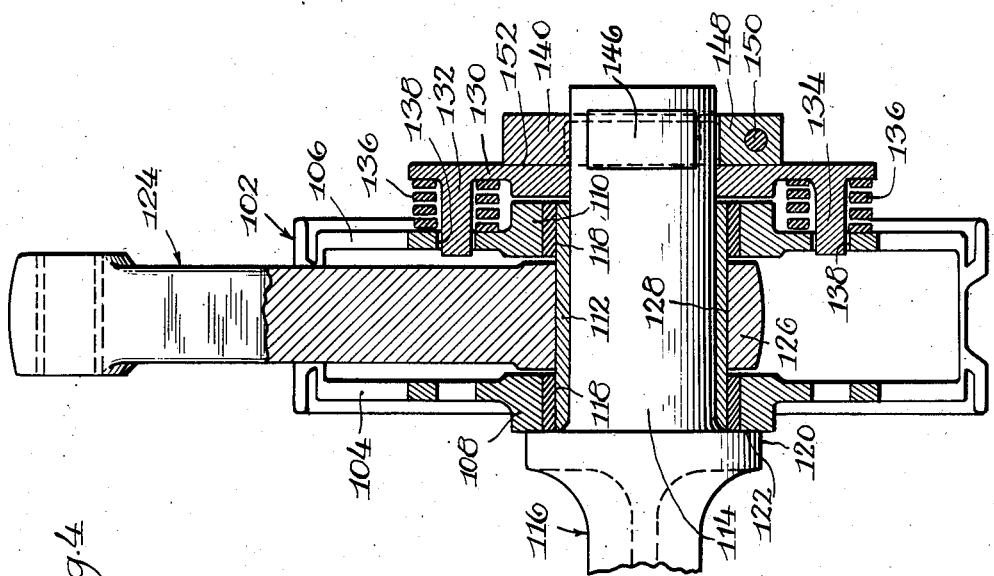
INVENTOR.
Walter L. Schlegel, Jr.
BY
Atty.

Patented Jan. 18, 1949

2,459,776

UNITED STATES PATENT OFFICE 2,459,776

BRAKE HEAD BALANCING DEVICE

Walter L. Schlegel, Jr., Chicago, Ill., assignor to American Steel Foundries, Chicago, Ill., a corporation of New Jersey Application June 18, 1945, Serial No. 600,053

25 Claims. (Cl. 188—230)

My invention relates to railway brake equipment and more particularly to novel brake head mounting and balancing means.

An object of my invention is to provide novel means for mounting a brake head on an associated supporting brake member in such manner as to adjustably maintain or blanace the brake head in proper operative relation to a braking surface on a wheel.

A more specific object of my invention is to provide a brake head mounting and balancing arrangement comprising novel locking means for securing a brake head on a brake beam including means for frictionally resisting relative rotation of the same and for positively limiting said rotation within predetermined limits for the purpose of adjustably maintaining the brake head in its operative position with respect to the braking surface on the wheel.

Another object of my invention is to provide novel brake head adjusting means utilizing coil springs associated with the brake head and beam and operative to urge the same into frictional engagement, said springs being supported by means interlocked with the brake head in such manner as to prevent bending stresses on the springs during rotation of the brake head on the beam.

Still another object of the invention is to design an arrangement in which springs are compressed between the brake head member and an adjacent spring plate member whereby said members are urged apart axially of the beam into engagement with friction means thereon, means being provided to interlock said members against relative rotational movement, thereby preventing bending stresses on the springs.

The various novel features of the invention will be apparent from the following description and drawings, and will be particularly pointed out in the appended claims.

In the drawings:

Figure 1 is a side elevation of one embodiment of my invention;

Figure 2 is a sectional view taken in the plane represented by line 2—2 of Figure 1;

Figure 3 is a side elevation of a modification of my invention; and

Figure 4 is a sectional view taken in the plane represented by the line 4—4 of Figure 3.

Describing the embodiment of my invention shown in Figures 1 and 2, the brake head generally designated 2 comprises the spaced inboard and outboard side walls 4 and 6 providing parallel bearing portions 8 and 10, respectively, said side walls having a transverse wall 12 extending therebetween and merging therewith, said transverse wall also merging with the spaced end or toe lugs 14 and 16 as well as the intermediate lugs 18, said lugs being formed and arranged for connection to an associated brake shoe in conventional manner.

The brake hanger, generally designated 20, is formed at its upper end with bushed opening 22 affording a pivotal connection to a supporting frame member (not shown). The opposite end of said hanger 20 is provided with a bearing portion 24 extending between the spaced side walls 4 and 6 of the brake head.

The brake beam, generally designated 26 is provided with a trunnion 28 on which may be tightly fitted, as by a press fit, a bushing 30. The trunnion extends through aligned openings in the brake head bearing portions 8 and 10 and the hanger bearing portion 24, with the bushing 30 on said trunnion in bearing engagement with the bearing portion 24 as at 34 and as at 36 with the bushings 38 and 40 fitted respectively in the bearing portions 8 and 10 of the brake head.

Disposed between the side wall 4 of the brake head and an annular shoulder 42 formed on the trunnion 28 of the brake beam 26 is a spring plate 44 received on said trunnion 28 and having abutment with the shoulder 42 thereof as at 46 and bearing against the bushing 30 on said trunnion as at 48. The spring plate 44 is provided with spaced lugs 50 and 52 having springs 54 and 56 sleeved thereover and compressed between said plate and the side wall 4 of the break head 2, said lugs being received within openings 58, 58 of the side wall 4 of the brake head whereby said spring plate is positively interlocked with the brake head 2 for rotation therewith on the trunnion 28 in such manner that bending stresses on the springs with resultant possible breakage of the same is prevented as the brake head rotates on the trunnion 28.

The brake assembly described is maintained in assembled relation by means of a U-shaped washerlike retaining member 60 having the spaced legs 62 and 64 thereof fitting within substantially parallel slots 66, 66 in the sides of the trunnion end and in interlocking engagement therewith. It may be noted that the pressure of the springs 54 and 56 maintains the retaining member in tight engagement with the trunnion end. It will be apparent that the retainer member 60 also serves, besides its function of maintaining the brake assembly in assembled relationship, to place the springs 54 and 56 in compression whereby the spring plate 44 will be urged into frictional engagement with the shoulder 42 of the trunnion and the bearing portion 10 of the brake head 2 into frictional engagement with the retaining member 60 as at 67 whereby the movement of rotation of the brake head is frictionally resisted and the break head is adjustably maintained in its normal operative relation to the braking surface of an associated wheel.

To prevent the possibility of the member 60 creeping upwardly, a filler block 68 may be inserted between the spaced legs 62 and 64 of the member 60 and secured thereto by a bolt 70 passing through aligned openings in said block and said legs and having threaded engagement with a nut 72.

In order to prevent pivotal movement of the brake head on the trunnion 28 of the beam 26 to an extent precluding the brake head adjusting itself to an operative position with respect to the braking surface of an associated wheel, novel stop means are provided by the retaining member 60 and the brake head 2 for effecting this result. More particularly, the bearing portion 10 of the brake head 2 is formed with oppositely disposed lugs 74 and 76 adjacent respective legs 62 and 64 of the retaining member 60, each of said lugs 74 and 76 having a V-shaped face including tapered surfaces 78 and 80 converging toward the adjacent leg and adapted to have engagement therewith for limiting rotation of the brake head. It will be apparent that movement of rotation of the brake head on the beam trunnion will be restricted by the engagement of the similarly tapered surfaces of the lugs 74 and 76 within limits permitting the brake head to adjust itself to proper operative position with the wheel.

It will be understood that the retaining member 60 performs three functions, namely, the placing of the springs in compression for operatively urging the brake head side wall 6 and the member 60 and also the plate 44 and the shoulder 42 into frictional engagement for the purpose of resisting rotation of the brake head on the beam, and also to limit pivotal movement of the brake head in cooperation with the lugs 74 and 76 on the brake head, and additionally to maintain the brake assembly in assembled condition.

It may be noted that the brake head side wall 6 is formed with openings 82 symmetrically arranged with respect to the openings 58 in the side wall 4 to permit convenient mounting of the spring plate 44 when the position of the brake head is reversed.

In assembling my novel brake head balancing device, the brake head and brake hanger are placed in assembled relationship with the openings in the bearing portions thereof in alignment. The spring plate 44 is then slipped on the trunnion end 28 of the beam and thereafter the brake head and hanger are slipped on the trunnion end. The springs 54 and 56 may then be positioned on the lugs 50 and 52, respectively, and the lugs positioned in the openings in the brake head wall 4. The springs may then be compressed by urging the brake head toward the shoulder 42 of the beam 26 in order to insert the legs 62 and 64 of the retaining member 60 into the spaced slots in the end of the trunnion and thereafter the filler block 68 may be inserted between the legs of the member 60 and secured thereto by means of the bolt and nut assembly.

Referring now to the modification of my invention illustrated in Figures 3 and 4, the brake assembly there shown is substantially identical with that previously described but differs therefrom in that the brake head balancing means are disposed on the brake beam at the outboard side of the brake head, said assembly comprising the brake head 102 having the side walls 104 and 106 provided with the bushed bearing portions 108 and 110 in engagement with the bushing 112 of the trunnion 114 of the brake beam 116 as at 118, the bearing portion 108 of the brake head bearing against the shoulder 120 on said beam as at 122. The brake hanger 124 extends between the side walls 104 and 106 and has the bearing portion 126 thereof in engagement with the bushing 112 as at 128.

Mounted on the end of the trunnion 114 adjacent the bearing portion 110 of the brake head 102 and the bushing 112 on the trunnion 114 is the spring plate 130 having the spaced lugs 132 and 134 thereof extending through the associated springs 136, 136 and the openings 138, 138 in the side wall 106 of the brake head, said plate 130 thus being interlocked with the brake head for rotation therewith on the trunnion 114 to prevent bending stresses on the springs compressed between said plate and brake head.

The brake assembly described is maintained in assembled relationship by the U-shaped retaining member 140 having the spaced legs 142 and 144 received within the parallel slots 146, 146 in the end of the trunnion 114 and secured to said trunnion against accidental disassembly by means of the filler block 148 and the nut and bolt assembly 150 as described in the preferred embodiment of my invention, said member 140 seating against the spring plate 130 as at 152 whereby the springs are maintained in compression for urging the plate 130 into frictional engagement with the member 140 and the bearing portion 108 of the brake head into frictional engagement with the shoulder 120 of the beam 116.

To limit rotation of the brake head on the trunnion 114 of the beam 116, the spring plate 130 is provided with the outwardly disposed stop lugs 154, 154 each having surfaces 156 and 158 converging toward the adjacent leg of the member 140 and adapted to have engagement therewith to permit rotation of the brake head only between the limits within which the brake head may adjust itself to the braking surface of the wheel.

In the assembly of the brake arrangement shown in Figures 3 and 4, the brake head and hanger are placed in assembled relationship with the openings in the bearing portions thereof in alignment for reception of the trunnion 114 of the brake beam 116. The spring plate 130 is then positioned on the trunnion 114 with the lugs 132 and 134, carrying the springs 136, 136, disposed in the openings 138, 138 in the brake head wall 106 and thereafter the retaining member 140 may have the legs 142 and 144 received within the slots 146, 146 in the trunnion end. The filler block 148 is then positioned between the legs 142 and 144 of the member 140 and secured thereto by the bolt and nut assembly.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a brake assembly, a brake head having spaced inboard and outboard walls, a beam provided with a shoulder and having a reduced trunnion end extending through aligned openings in said walls, a spring plate sleeved on said trunnion end in abutment with said shoulder and having spaced lugs extending into complementary openings in said inboard wall, a U-shaped retaining member having the spaced legs thereof receiving said trunnion end therebetween and extending through slots in the sides of said trunnion end, a block between said legs, a bolt and nut assembly extending through aligned openings in said legs and said block to prevent accidental disengagement of said member from said trunnion end, resilient means sleeved over said lugs and compressed between said plate and said inboard wall for urging said plate into frictional engagement with said shoulder and the outboard wall of said head into frictional engagement with said member, and stop lugs formed on said outboard wall adjacent respective legs of said member, each of said stop lugs having surfaces converging toward the adjacent leg for engagement therewith to limit rotation of said plate and said head on said beam.

2. In a brake assembly, a brake head having spaced inboard and outboard walls, a beam provided with a shoulder and having a reduced trunnion end extending through aligned openings in said walls, an annular spring plate sleeved on said trunnion end in abutment with said shoulder and having spaced lugs extending into complementary openings in said inboard wall, a U-shaped retaining member having the spaced legs thereof receiving said trunnion end therebetween and extending through slots in the sides of said trunnion end, a block between said legs, means for securing said block to said legs to prevent accidental disengagement of said member from said trunnion end, resilient means sleeved over said lugs and compressed between said plate and said inboard wall for urging said plate into frictional engagement with said shoulder and the outboard wall of said head into frictional engagement with said member, and stop lugs formed on said outboard wall adjacent respective legs of said member, each of said stop lugs having surfaces converging toward the adjacent leg for engagement therewith to limit rotation of said plate and said head on said beam.

3. In a brake assembly, a brake head having spaced inboard and outboard walls, a beam provided with a shoulder abutting said inboard wall and having a reduced trunnion end extending through aligned openings in said walls, an annular spring plate on said trunnion end and having spaced lugs extending into openings in said outboard wall, a U-shaped retaining member having the spaced legs thereof receiving said trunnion end therebetween and extending through slots in the sides of said trunnion end, a block between said legs, means for securing said block to said legs to prevent accidental disengagement of said member from said trunnion end, resilient means sleeved over said lugs and compressed between said plate and said outboard wall for urging said plate into frictional engagement with said member and the inboard wall of said head into frictional engagement with said shoulder, and stop lugs formed on said plate adjacent respective legs of said member, each of said stop lugs having surfaces converging toward the adjacent leg for engagement therewith to limit rotation of said plate and brake head on said beam.

4. In a brake assembly, a brake head having spaced inboard and outboard walls, a beam provided with a shoulder and having a reduced trunnion end extending through aligned openings in said walls, an annular spring plate sleeved on said trunnion end in abutment with said shoulder and having spaced lugs extending into complementary openings in said inboard wall, a U-shaped retaining member having the spaced legs thereof receiving said trunnion end therebetween and extending through slots in the sides of said trunnion end, a block between said legs, a bolt and nut assembly extending through aligned openings in said legs and said block to prevent accidental disengagement of said member from said trunnion end, resilient means sleeved over said lugs and compressed between said plate and said inboard wall for urging said plate into frictional engagement with said shoulder and the outboard wall of said head into frictional engagement with said member, and interengaging means on said member and said outboard wall for limiting rotation of said head and plate on said beam.

5. In a brake assembly, a brake head having spaced inboard and outboard walls, a beam provided with a shoulder abutting said inboard wall and having a reduced trunnion end extending through aligned openings in said walls, an annular spring plate on said trunnion end and having spaced lugs extending into openings in said outboard wall, a U-shaped retaining member having the spaced legs thereof receiving said trunnion end therebetween and extending through slots in the sides of said trunnion end, a block between said legs, a bolt and nut assembly extending through aligned openings in said legs and said block to prevent accidental disengagement of said member from said trunnion end, resilient means sleeved over said lugs and compressed between said plate and said outboard wall for urging said plate into frictional engagement with said member and the inboard wall of said head into frictional engagement with said shoulder, and stop lugs formed on said plate adjacent respective legs of said member, each of said stop lugs having surfaces converging toward the adjacent leg for engagement therewith to limit rotation of said plate and brake head on said beam.

6. In a brake assembly, a brake head having spaced inboard and outboard walls, a beam provided with a shoulder and having a reduced trunnion end extending through aligned openings in said walls, an annular spring plate on said trunnion end in abutment with said shoulder and having spaced lugs extending into complementary openings in said inboard wall, a U-shaped retaining member having the spaced legs thereof receiving said trunnion end therebetween and extending through slots in the sides of said trunnion end, a block between said legs, a bolt and nut assembly extending through aligned openings in said legs and said block to prevent accidental disengagement of said member from said trunnion end, and resilient means sleeved over said lugs and compressed between said plate and said inboard wall for urging said plate into frictional engagement with said shoulder and the outboard wall of said head into frictional engagement with said member.

7. In a brake assembly, a brake head having spaced inboard and outboard walls, a beam provided with a shoulder and having a reduced trunnion end extending through aligned openings in said walls, an annular spring plate sleeved on said trunnion end in abutment with said shoulder and having spaced lugs extending into complementary openings in said inboard wall, a U-shaped retaining member having the spaced legs thereof receiving said trunnion end therebetween and extending through slots in the sides of said trunnion end, a block between said legs and secured thereto to prevent accidental disengagement of said member from said trunnion end, and resilient means sleeved over said lugs and compressed between said plate and said inboard wall for urging said plate into frictional engagement with said shoulder and the outboard wall of said head into frictional engagement with said member.

8. In a brake assembly, a brake head having spaced inboard and outboard walls, a beam provided with a shoulder abutting said inboard wall and having a reduced trunnion end extending through aligned openings in said walls, an annular spring plate on said trunnion end and having spaced lugs extending into openings in said outboard wall, a U-shaped retaining member having the spaced legs thereof receiving said trunnion end therebetween and extending through slots in the sides of said trunnion end, a block between said legs, a bolt and nut assembly extending through aligned openings in said legs and said block to prevent accidental disengagement of said member from said trunnion end, and resilient means sleeved over said lugs and compressed between said plate and said outboard wall for urging said plate into frictional engagement with said member and the inboard wall of said head into frictional engagement with said shoulder.

9. In a brake assembly, a brake head having spaced inboard and outboard walls, a beam provided with a shoulder abutting said inboard wall and having a reduced trunnion end extending through aligned openings in said walls, an annular spring plate on said trunnion end and having spaced lugs extending into openings in said outboard wall, a U-shaped retaining member having the spaced legs thereof receiving said trunnion end therebetween and extending through slots in the sides of said trunnion end, a block between said legs and secured thereto to prevent accidental disengagement of said member from said trunnion end, and resilient means sleeved over said lugs and compressed between said plate and said outboard wall for urging said plate into frictional engagement with said member and the inboard wall of said head into frictional engagement with said shoulder.

10. In a brake assembly, a brake head having spaced walls, a beam having a reduced trunnion and extending through aligned openings in said walls, a spring plate on said trunnion end adjacent one of said walls and having spaced lugs extending within openings in said wall, resilient means sleeved over said lugs and compressed between said plate and said wall, a retaining member having spaced lugs in engagement with slots in the outer extremity of said trunnion end for maintaining said assembly in assembled relationship, and interengaging means on said member and the other of said walls limiting rotation of said plate and head on said beam.

11. In a brake assembly, a brake head having spaced walls, a brake beam having a reduced trunnion end extending through aligned openings in said walls, a spring support member on said end and having spaced projections extending within substantially close fitting openings in one of said walls, said head and said member being disposed between spaced friction means on said trunnion end, and resilient means sleeved over said projections and compressed between said support member and the associated wall for urging said member into frictional engagement with one of said friction means and the other of said walls into frictional engagement with the other of said friction means.

12. In a brake assembly, a brake head, a support pivotally carrying said head, a member in interlocking engagement with said head and rotatable therewith, a retaining member comprising spaced rigid means received within transverse slots in said support at one end thereof for maintaining said assembly in assembled relationship, friction means on said support at the other end thereof, and resilient means compressed between said interlocking member and said head for operatively urging said head and said interlocking member into frictional engagement with said friction means and said retaining member.

13. In a brake assembly, a brake head member having spaced walls, a beam having a reduced trunnion end extending through aligned openings in said walls, a spring plate member on said trunnion end adjacent one of said walls and having spaced lugs extending within openings in said wall, resilient means sleeved over said lugs and compressed between said plate member and said wall, a retaining element having spaced lugs in engagement with slots in the outer extremity of said trunnion end for maintaining said assembly in assembled relationship, and interengaging means on said element and one of said members limiting rotation of said plate and head on said beam, said last-mentioned means being visible from the outboard side of said assembly.

14. In a brake assembly, a brake head having spaced walls, a beam having a reduced trunnion end extending through aligned openings in said walls, a spring plate on said trunnion end adjacent one of said walls and having spaced lugs extending within openings in said wall, resilient means sleeved over said lugs and compressed between said plate and said wall, and a retaining member having spaced lugs in engagement with slots in said trunnion end adjacent its outer extremity for maintaining said assembly in assembled relationship.

15. In a brake head assembly, a break beam with a trunnion end, a brake head member and a spring plate member sleeved on said end, a retainer washer interlocked with said end and frictionally engageable with one of said members, resilient means compressed between said members, stop means on said one member engageable with said washer to limit relative rotational movement therebetween, and means extending through respective resilient means and positively interlocking said members against relative rotational movement while accommodating relative movement between said members axially of said end.

16. In a brake arrangement, a support element, an assembly comprising a brake head member and a friction member pivoted on said element, abutment means on said element at opposite sides of said assembly in engagement with said head member and said friction member respectively, resilient means operatively associated with said members urging the same against the respective abutment means, and rigid means on one of said members positioning said resilient means and projecting into the other of said members for interlocking said members against relative rotational movement while accommodating movement between said members axially of said element.

17. In a brake arrangement, an assembly including a brake head and a friction member, a pivot element extending therethrough, abutment means on said element at opposite sides of said assembly in engagement with said head and member respectively, a coil spring between said members reacting thereagainst, and means positioning said spring and interlocking said members against movement transaxially of the spring while accommodating movement between said members axially of the spring.

18. A brake head balancing device comprising a pivot element having a friction surface, a brake head member pivotally mounted on said element, a friction member pivotally mounted on said element, a retainer having an inboard friction surface and spaced legs embracing said element and received within complementary transverse slots in said element outboard said head member, spring means reacting between said brake head and friction members for urging one of said members against said element surface and the other member against said retainer surface, the legs of said retainer having spaced abutment faces, and lug means on the outboard surface of said other member having abutment surfaces engageable with respective faces to limit relative rotational movement between the element and said other member.

19. In a brake head balancing device, a trunnion with a shoulder, a brake head member and a spring plate member sleeved on said end for rotation thereon, means for limiting relative rotational movement between said members, a brake hanger sleeved on said end between spaced walls of the brake head member, opposed slots in the periphery of said trunnion adjacent the outboard end thereof, a washer with spaced lugs received within respective slots, spring means reacting between said members for urging one of said members against said shoulder and the other of said members against said washer, and a lug on the outboard face of said other member having flat surfaces adapted for complementary flat face engagement with marginal surfaces of said washer to positively limit rotation of said other member on said end, said lug being visible from the outboard end of said trunnion.

20. In a brake head balancing device, a trunnion with a shoulder, a brake head member and a spring plate member sleeved on said trunnion for rotation thereon, means for limiting relative rotational movement between said members, a brake hanger sleeved on said trunnion between spaced walls of the brake head member, opposed slots in the periphery of said trunnion adjacent the outboard end thereof, a washer with spaced lugs received within respective slots, spring means reacting between said members for urging one of said members against said shoulder and the other of said members against said washer, and spaced lugs on the outboard face of said other member, said lugs having V-shaped surfaces and merging towards the axis of said trunnion and adapted for flat face engagement with the respective legs of said washer to limit rotation of said other member on said trunnion.

21. In a brake assembly, a pivot element, a brake head member and a plate member pivoted thereon, interengaging means on said members interlocking the same against substantial rotational movement therebetween, a retaining washer adjacent the outboard face of one of said members and in flat face engagement therewith and having spaced legs in engagement with slots in the outer extremity of said element, resilient means between said members urging said one member into said engagement, and stop means on the outboard side of said one member adapted for abutment with the marginal surfaces of said washer for limiting the rotation of said members on said element.

22. In a brake assembly, a trunnion with a shoulder, a brake head member and a spring support plate member rotatably mounted on said trunnion, interengaging means on said members locking the same against substantial rotational movement therebetween, transverse slots in said trunnion adjacent the outboard extremity thereof, a retaining element sleeved over said trunnion and having spaced legs with adjacent edges thereof extending into said slots and embracing said trunnion therebetween, resilient means between said members urging them apart and one of said members into frictional engagement with said shoulder and the other of said members into frictional engagement with said retaining element, and lugs on the outboard face of said other member at opposite sides of said element adjacent the remote edges thereof adaptable for abutment with said edges for limiting the rotational movement of said members on said trunnion.

23. In a brake assembly, a brake head having spaced inboard and outboard walls, a beam provided with a shoulder abutting against said inboard wall and having a reduced trunnion end extending through aligned openings in said walls, an annular spring plate on said trunnion end and having spaced lugs extending into substantially close fitting aligned openings in said outboard wall, a U-shaped retaining member having the spaced legs thereof receiving said trunnion end therebetween and extending through diametrically opposed slots in said trunnion end adjacent the outboard extremity thereof, a block between said legs, a nut and bolt assembly extending through aligned openings in said legs and said block to prevent accidental disengagement of said member from said trunnion end, resilient means sleeved over said lugs and compressed between said plate and said outboard wall for urging said plate into frictional engagement with said member and the inboard wall of said head into frictional engagement with said shoulder, said lugs causing said plate and head to rotate together on said end and preventing bending stresses on said resilient means, and interengaging means on said plate and said member for limiting rotation of said head and plate on said end.

24. In a brake assembly, a brake head having spaced walls, a brake beam having a reduced trunnion and extending through aligned openings in said walls, a spring support member on said end and having spaced projections extending within openings in one of said walls, a retaining member saddled on said trunnion end adjacent the outer extremity thereof and outboard said spring-supporting member and having spaced legs embracing said end therebetween, and resilient means sleeved over said projections and compressed between said spring support member and said one wall for urging said spring support member into frictional engagement with said retaining member and the legs thereof and the other of said walls into frictional engagement with a portion of said beam adjacent the inner end of said trunnion end.

25. In a brake assembly, a beam having a shoulder and a reduced trunnion end, a U-shaped washer saddled on said end adjacent the outboard extremity thereof, a brake head member and a spring support member pivoted on said end between said shoulder and washer, means interlocking said members against relative rotation therebetween, resilient means between said members urging them apart and one of said members into frictional engagement with said washer and the other of said members into frictional engagement with said shoulder, and stop means on said one member visible from the outboard side of said assembly adapted for engagement with the edges of said washer for limiting rotation of said members on said end.

WALTER L. SCHLEGEL, JR.

REFERENCES CITED

The following references are of record in the file of this patent:

UNITED STATES PATENTS

| Number | Name | Date |
| --- | --- | --- |
| 772,170 | Morton | Oct. 11, 1904 |
| 1,604,351 | Hedgcock | Oct. 26, 1926 |
| 2,010,531 | Baselt | Aug. 6, 1935 |
| 2,281,535 | Drews | Apr. 28, 1942 |